Patented June 16, 1953

2,642,154

UNITED STATES PATENT OFFICE 2,642,154

TREATMENT OF GASEOUS MIXTURES

James William Woolcock, Norton-on-Tees, England, assignor to Imperial Chemical Industries Limited, a corporation of Great Britain No Drawing. Application June 29, 1951, Serial No. 234,444. In Great Britain August 14, 1950

8 Claims. (Cl. 183—115)

This invention relates to the treatment of gaseous mixtures and in particular to the treatment of such mixtures for the removal and, if desired, the recovery of constituents thereof.

It has already been proposed to recover or remove constituents from gaseous mixtures by treating them, in an absorption step at ordinary or subatmospheric temperature and/or under increased pressure, with liquids from which, if desired, the constituent is subsequently removed or recovered in a regeneration step by the application of heat and/or reduced pressure.

The efficiency and economy of operation of such processes mainly depend on the solvent capacity of the liquid for the gas to be recovered or removed and on the temperature coefficient of the solubility of the gaseous constituent in the liquid being used, that is to say, on the change in quantity of the gaseous constituent absorbed in the liquid or liberated from a solution of the gaseous constituent in the liquid, for a given change in temperature. It will be understood that for satisfactory operation of processes of the type described for treating gases, a high temperature coefficient of solubility is desirable. Thus, with a given liquid it is desirable that at a given pressure there should be a considerable increase in the quantity of gaseous constituent absorbed by it for a small decrease in temperature and that the quantity of gaseous constituents liberated from its solution in the liquid should be considerable for a small increase in temperature.

Such processes may be operated in both steps at the same pressure, which may be atmospheric pressure, but in some cases they are operated at different pressures; in general the process may be more efficiently carried out by operating in the absorption step at elevated pressure and in the regeneration step at a lower pressure which may be subatmospheric pressure; thus, for a given gas and a given absorbent, the effects of the change in temperature from that used in the absorption step to that used in the regeneration step may be considerably enhanced by an accompanying change in pressure in the sense above indicated.

It has now been found that when the absorbent liquid containing the absorbed gaseous constituent also contains in solution a further liquid or liquids, its vapour pressure at a given elevated temperature, increases rapidly with increasing concentration of the further liquid or liquids. In particular it has been found that an increased temperature coefficient of solubility can be obtained by employing mixtures of liquids, including an absorbent for the gaseous constituent to be removed or recovered, which form a smaller number of liquid phases at the temperature of the regeneration step than they do at the temperature of the absorption step.

As a practical application of the above considerations the present invention provides a process for the recovery of a constituent from a gaseous mixture in which the gaseous mixture is brought into contact with a liquid comprising an absorbent for the said constituent, the liquid thereafter being subjected to elevated temperature in the presence of at least one further liquid, whereby the constituent is regenerated, the liquids used and the proportions thereof being such that, at the temperature of regeneration, the liquid mixture exists as one or more liquid phases but which at a lower temperature separates into a larger number of phases, one of which comprises predominantly the absorbent for the said gaseous constituent.

It should be understood that with a given gaseous constituent and liquid absorbent the process of the present invention may be carried out if desired by operating with a pressure difference between the absorption step and the regeneration step in the sense hereinbefore described. In general, for a given solvent it has been found that with the process of the present invention a lower ratio of pressure in absorption step to pressure in regeneration step can be successfully used to give a result comparable with that obtained with the processes of the prior art using a higher ratio of pressures. A further advantage of the process of the present invention is therefore that if pressure differences are to be used an economy in compression costs is obtained as compared with those of the prior art.

The liquid which is the absorbent for the gaseous constituent to be removed or recovered may act simply as a solvent or absorbent for the said constituent, or it may form a loose chemical compound or complex therewith, which, on the application of heat decomposes to liberate the gaseous constituent and the liquid in substantially unchanged form. It should not have too low a boiling point and it should be substantially inert to the other constituents of the gaseous mixture being treated and to the other liquids which may be present.

The gaseous constituent to be removed or recovered should be substantially inert towards and of low solubility in the further liquid or liquids which may be present; the other liquid or liquids should also not react chemically with the absorbent for the gaseous constituent, should not in general have too low a boiling point or boiling points and should not exert too high a vapour pressure at temperatures in the temperature range of operating the process. If they are cheap, the further liquids may however have lower boiling points than the absorbent liquid, as it becomes economically unimportant if they are carried away as vapour in the unabsorbed gas or in the regenerated gas. In some circumstances the further liquid or liquids may be an absorbent for one or more of the other constituents of the gaseous mixture being treated, and by suitable choice of the further liquid or liquids and of operating conditions, these other gaseous constituents may also be recovered.

In general it is preferred to provide for the presence of only one further liquid, which, with the absorbent liquid chosen, forms only one liquid phase at the temperature of the regeneration step; and which, with the absorbent liquid, forms a mixture that separates into only two liquid phases at a lower temperature which is lower than the regeneration temperature.

While the absorption process may be carried out at the lower temperature with the heterogeneous liquid mixture of the absorbent and the further liquid or liquids, it is preferable to carry out the absorption step using a homogeneous liquid comprising mainly the absorbent and to add the further liquid or liquids subsequently and before heating for the regeneration step. Preferably the absorbing liquid containing its dissolved gas and the additional liquid are mixed and introduced to the regeneration zone where they are heated to form a single liquid phase and to regenerate the gaseous constituents. One suitable form of regeneration zone is a boiler provided with a column. If desired the two liquids may be introduced separately to the boiler and mixed there. Furthermore, if desired the additional liquid, e. g., water, may be introduced at least in part in vapour form and thus be employed to heat the mixture directly.

It will be understood that substances may be chosen for use in the process of the present invention, which while liquid under all conditions of operation, are solids at ordinary temperatures in the absence of each other.

The following description illustrates, in a general way, the operation of the process of the present invention. A gaseous constituent A may be recovered from a gaseous mixture by using two liquids B and C which are sparingly miscible with one another at a lower temperature $T_1$, and completely miscible in all proportions at and above a higher temperature $T_2$, the gaseous constituent A being much more soluble at any given temperature in liquid B than in liquid C. In the absorption step, the gaseous mixture may be treated with both liquid phases together, namely liquid B saturated at temperature $T_1$, with liquid C, and liquid C saturated at temperature $T_1$, with liquid B, elevated pressure being used if desired. After the absorption step the liquid is heated to temperature $T_2$ whereby a gas having an enhanced concentration of constituent A is liberated, at the same time the liquid becoming homogeneous. When the desired degree of regeneration has been achieved, the liquid is allowed to cool to temperature $T_1$ whereby it separates into two liquid phases which may be used again in the absorption step. In some cases it may be more convenient, in the absorption step, to use only a single liquid phase, which may be the liquid B, in which case, the further liquid C is added after the absorption step and before the regeneration step. After regeneration and cooling, there will be obtained a two-phase liquid comprising liquid B saturated with C and liquid C saturated with B, at the temperature $T_1$; the liquid B saturated with C may now be used for treating further quantities of the gaseous mixture and the liquid C saturated with liquid B may be used as the further liquid and introduced into the process before the regeneration step. In carrying out this process, there may be used, if desired, a pressure difference between the absorption and regeneration steps.

As an example of the application of the process of the present invention may be mentioned the recovery of acetylene from gaseous mixtures containing it. Acetylacetone ($CH_3.CO.CH_2.CO.CH_3$) saturated with water is used at ordinary pressures and temperatures for absorbing acetylene from a gaseous mixture also containing other hydrocarbons. An approximately equal weight of water saturated with acetylacetone at ordinary temperature is added to the liquid from the absorption step and the liquid mixture heated to e. g., 90° C. and subjected to reduced pressure whereby a gas rich in acetylene is liberated. On cooling, the liquid separates into two layers, one of which is acetylacetone saturated with water, which may be re-used in the absorption step, the other layer being water saturated with acetylacetone which may be used for addition to the process after the absorption step. The use of such a process is advantageous as compared with the use of acetylacetone alone. The solubility of acetylene in acetylacetone saturated with water at normal temperatures is not very considerably lower than that in pure acetylacetone, while the degree of regeneration of acetylene at 90° C. after adding an approximately equal weight of the water rich layer is very good and much better than it would be for acetylacetone alone at the same temperature and pressure. In addition less acetylacetone vapour is carried off with the regenerated acetylene than where the same degree of regeneration from pure acetylacetone is achieved by using a higher temperature and/or a lower pressure.

Taking into account the following somewhat conflicting factors: maximum absorption capacity in the absorption stage; minimum heat requirements for the regeneration stage; and minimum concentration of the desired gaseous constituent in the absorbing liquid recycled, it is preferred to operate with proportions of the absorbing and additional liquids which correspond to the composition represented by the consolute temperature. It is also possible to operate usefully with compositions on either side of this composition, but with certain disadvantages which tend to increase as this composition is departed from. As the proportion of absorbing liquid in the mixture increases above this composition there is increasing tendency for the desired gas to be retained in solution in the absorbing liquid returned from the regeneration stage to the absorption stage. This in turn reduces the absorption capacity of the liquid and of the system. On the other hand, as the proportion of absorbing liquid in the mixture falls below this composition the total amount of liquid circulated in the system per unit of gas regenerated increases, with the attendant disadvantages of larger heat requirement per unit of gas regenerated, and larger plant capital cost. For these reasons it is desirable that the process should be operated using compositions in which the weight percentage of the absorbing liquid in the mixture varies from the consolute concentration by not more than ±10% and preferably corresponds to the consolute composition. In the case of acetylacetone and water the consolute concentration of acetylacetone is approximately 56% by weight.

The invention is illustrated by the following examples, in which both stages were operated at atmospheric pressure.

*Example 1*

A gaseous mixture containing acetylene, obtained by the partial combustion of methane, and having the composition by volume:

| | Per cent |
|---|---|
| $H_2$ | 48 |
| CO | 33 |
| $C_2H_2$ | 9 |
| $CH_4$ | 6 |
| $CO_2$ | 4 | was passed into a scrubbing tower where it was scrubbed at a temperature of 20° C. with a saturated solution of water in acetylacetone which was continuously fed to the tower. The scrubbed gas issuing from the tower contained about 0.1% of acetylene.

The solution of acetylene leaving the base of the scrubbing tower was brought into contact with a stream of water saturated with respect to acetylacetone at 20° C. The resulting mixture was heated to 85 to 90° C. in a heater, and thereafter passed to a disengaging tank, in which an acetylene rich gas with the composition by volume:

| | Per cent |
|---|---|
| $H_2$ | 0.4 |
| CO | 0.3 |
| $C_2H_2$ | 79.8 |
| $CO_2$ | 16.2 |
| $CH_4$ | 0.1 |
| Water vapour | 2.2 |
| Acetylacetone vapour | 1.0 |
| | 100.0 | was separated and passed to storage via a cooler. The stripped liquid leaving the base of the disengaging tank at a temperature of 85 to 90° C. was passed through a cooler to a separator maintained at 20° C. in which separation into acetylacetone and water rich layers took place. The former was recycled to the scrubbing tower and the latter re-used for treatment of the liquid leaving the scrubbing tower. The composition of these two layers respectively was by weight:

| Layer | Acetyl Acetone, Percent | Water, Percent |
|---|---|---|
| Acetylacetone Rich | 96 | 4 |
| Water Rich | 14 | 86 |

*Example 2*

The initial gas composition and the operating details were the same as described in Example 1 except that ethylene diacetate was used instead of acetylacetone, and the temperature of regeneration was greater than 92° C.

The gaseous product had the following composition by volume:

| | Per cent |
|---|---|
| $H_2$ | 0.4 |
| CO | 0.3 |
| $C_2H_2$ | 81.4 |
| $CO_2$ | 15.0 |
| $CH_4$ | 0.1 |
| Water vapour | 2.5 |
| Ethylene diacetate | 0.3 | and the composition of the two liquids which were recycled was as follows:

| Layer | Ethylene Diacetate, Percent | Water, Percent |
|---|---|---|
| Water Rich | 18 | 82 |
| Ethylene Diacetate Rich | 88 | 12 |

In some cases, particularly where a valuable liquid absorbent is used, it is advantageous to treat the regenerated gas or the gas rejected from the absorption step for the recovery of such absorbent which may be present in the vapour state. This may be carried out by known means as desired, but it is desirable to treat it in a subsidiary step with an absorbent comprising the further liquid or liquids to be used in the process of the present invention, whereby it is possible to produce a liquid suitable for addition to the process after the main absorption step. Such a subsidiary absorption step may be carried out at higher than ordinary temperatures to give a solution saturated with the absorbent for the gaseous constituent to be removed or recovered and then, by cooling to ordinary temperatures to obtain a two-phase liquid, one layer of which may be poor in the absorbent and which can be added to the main process after the absorption step, or can be used for scrubbing further quantities of regenerated gas. The other layer, which is rich in absorbent liquid, may be returned to the main body of the absorbent in the process.

It will be understood that if the absorbent for the gaseous constituent to be removed or recovered also dissolves any other gas which may be present in the gaseous mixture, the regenerated gas may be further treated with another solvent which is selective for that other gas either by known means or by a repetition of the process of the present invention, using suitable liquids for effecting a separation of the gases under consideration. Thus when separating acetylene from the gas mixture obtained in the partial combustion of methane by means of acetylacetone or ethylene diacetate according to the invention it is found that the regenerated acetylene contains an appreciable amount of $CO_2$. This may be removed from the acetylene by selective absorption with, for example, aqueous monoethanolamine.

The process of the present invention is suitable for use in cyclic processes in which the absorbent liquid is continuously circulated through the absorption and regeneration steps, and is therefore particularly useful where valuable liquids are used in the process. Such a process may be conducted by: contacting the gas with the absorbing liquid, for example, in a packed tower; bringing the resulting solution into contact with a suitable volume of the further liquid obtained as hereinafter defined; passing the mixture to a regenerating vessel and raising the temperature, whereby the desired gaseous constituent is regenerated; leading the homogeneous liquid from the regeneration zone to a decanter; cooling the liquid in the decanter to a temperature such that two phases separate; returning the phase rich in the absorbing liquid to the absorption tower; and employing the phase poor in absorbing liquid as the further liquid for the regeneration step.

It would be an advantage to run the decanter at as high a temperature as possible, but in practice the temperature at which it can be run is limited by the need for obtaining a layer sufficiently rich in the absorbing liquid and a sufficient proportion of that rich layer to give efficient absorption in the absorption stage. In practice the selection of the temperature in the decanter will depend among other things on the characteristics of the liquid/liquid solubility curve, the quantity of each liquid employed and the solubility characteristics of the gas/absorbing liquid physical system.

I claim:

1. A process for separating a constituent from a gaseous mixture which comprises bringing the gaseous mixture into contact with a liquid absorbent for the said constituent at a first temperature, and subjecting the resulting solution in the presence of at least one additional liquid to elevated temperature, whereby the said constituent is regenerated; the liquids used and their proportions being such that at the regeneration temperature the mixture of liquids exists as at least one liquid phase but at the first temperature exists as, a larger number of phases of which one comprises predominantly the absorbent for the said gaseous constituent.

2. A process for separating a constituent from a gaseous mixture which comprises bringing the gaseous mixture into contact with a liquid absorbent for the said constituent at a first temperature and subjecting the resulting solution in the presence of one additional liquid to elevated temperature, whereby the said constituent is regenerated; the liquids used and their proportions being such that at the regeneration temperature the mixture of liquids exists as a single liquid phase but at the first temperature exists as two liquid phases, one of which comprises predominantly the absorbent for the said gaseous constituent.

3. A process as claimed in claim 2 in which the absorption is conducted at atmospheric pressure.

4. A process as claimed in claim 2 for the separation of acetylene from gaseous mixtures containing it characterised by the features that acetylacetone is employed as the absorbing liquid and water as the additional liquid.

5. A process as claimed in claim 2 for the separation of acetylene from gaseous mixtures containing it characterised by the features that ethylene diacetate is employed as the absorbing liquid and water as the additional liquid.

6. A process for separating a constituent from a gaseous mixture which comprises bringing the gaseous mixture into contact with a liquid absorbent for the said constituent at a first temperature and subjecting the resulting solution in the presence of an additional liquid to elevated temperature, whereby the said constituent is regenerated, characterised in that the liquids used are such that at the regeneration temperature the mixture of liquids exists as a single liquid phase, but at the first temperature exists as two liquid phases of which one comprises predominantly the absorbent for the said gaseous constituent, and that the relative proportions of the two liquids are selected so that the concentration of the absorbing liquid in the mixture used in the regeneration stage falls within the range defined by the limiting concentrations which are 10 weight per cent greater than and 10 weight per cent less than the consolute concentration.

7. A process as claimed in claim 6 in which the relative proportions of the two liquids are selected so that the composition of the mixture used in the regeneration stage is approximately the consolute composition.

8. A process as claimed in claim 2 which is conducted continuously and comprises the combination of steps: contacting the gas with the absorbing liquid in an absorption zone; bringing the resulting solution into contact with additional liquid obtained as hereinafter defined; warming the mixture to a temperature at which it exists as a single liquid phase and thereby regenerating the desired gaseous constituent; cooling the liquid to a temperature at which it exists as two liquid phases; separating the phase rich in absorbing liquid and returning it to the absorption zone; and returning the phase poor in absorbing liquid to the regeneration stage for use there as the additional liquid.

JAMES WILLIAM WOOLCOCK.

References Cited in the file of this patent

UNITED STATES PATENTS

| Number | Name | Date |
|---|---|---|
| 2,366,360 | Semon | Jan. 2, 1945 |
| 2,370,530 | Gage | Feb. 27, 1945 |
| 2,371,908 | Morris et al. | Mar. 20, 1945 |
| 2,385,705 | Huffman | Sept. 25, 1945 |
| 2,389,144 | Evans et al. | Nov. 20, 1945 |
| 2,449,610 | Long | Sept. 21, 1948 |

FOREIGN PATENTS

| Number | Country | Date |
|---|---|---|
| 580,922 | Great Britain | Sept. 25, 1946 |